(12) United States Patent
Nallampatti Ekambaram et al.

(10) Patent No.: US 10,334,455 B2
(45) Date of Patent: Jun. 25, 2019

(54) REAL-TIME CO-CHANNEL INTERFERENCE SUPPRESSION

(71) Applicant: Intel Corporation, Santa Clara, CA (US)

(72) Inventors: Venkatesan Nallampatti Ekambaram, Hillsboro, OR (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 15/640,479

(22) Filed: Jul. 1, 2017

(65) Prior Publication Data

US 2019/0007845 A1 Jan. 3, 2019

(51) Int. Cl.
| | |
|---|---|
| *H04L 1/00* | (2006.01) |
| *H04W 24/02* | (2009.01) |
| *H04L 12/26* | (2006.01) |
| *H04L 5/00* | (2006.01) |
| *H04W 88/08* | (2009.01) |

(52) U.S. Cl.
CPC ......... *H04W 24/02* (2013.01); *H04L 5/0073* (2013.01); *H04L 43/16* (2013.01); *H04W 88/08* (2013.01)

(58) Field of Classification Search
CPC .... H04W 24/02; H04W 88/08; H04L 5/0073; H04L 43/16
See application file for complete search history.

(56) References Cited

U.S. PATENT DOCUMENTS

| | | | |
|---|---|---|---|
| 5,648,822 A | 7/1997 | Hulyalkar | |
| 6,047,020 A | 4/2000 | Hottinen | |
| 8,340,231 B1* | 12/2012 | Lee | H04L 25/061 375/262 |
| 2010/0248729 A1* | 9/2010 | Yu | H04B 7/026 455/450 |
| 2015/0373568 A1* | 12/2015 | Abrishamkar | H04W 72/0406 370/252 |
| 2016/0080053 A1* | 3/2016 | Sayana | H04B 7/0639 375/267 |

FOREIGN PATENT DOCUMENTS

WO 98/17071 A1 4/1998

OTHER PUBLICATIONS

Search Report dated Jul. 30, 2018 for International Application No. PCT/US18/32317.

* cited by examiner

*Primary Examiner* — Abdelnabi O Musa
(74) *Attorney, Agent, or Firm* — Schiff Hardin LLP (57) ABSTRACT

An apparatus and a method for identifying a desired signal and suppressing co-channel interference in real-time from a signal received over a wireless channel are disclosed. For example, the method, by a circuit, determines values of a first set of terms of a cost function that are based on received data, the cost function being a measure of a level of the received data being non-Gaussian, determines, by the circuit, optimal values of a set of weight vectors for maximizing the cost function, identifies, by the circuit, a desired signal based on the optimal values of the set of weight vectors and the values of the first set of terms, and decodes, by a channel decoder coupled to the circuit, a channel of the desired signal that is identified.

24 Claims, 6 Drawing Sheets

REAL-TIME CO-CHANNEL INTERFERENCE SUPPRESSION

The present disclosure describes a method and an apparatus for suppressing co-channel interference in real-time. Although, the method is described for suppressing co-channel interference in a device receiving signals over a wireless channel of a Long Term Evolution (LTE) network, the method may be implemented for signals received over any type of wireless network, e.g., a 3G network, a 5G network, a Wi-Fi network, and the like.

BACKGROUND

As usage of wireless networks expands, network service providers are challenged to meet larger and larger bandwidth requirements with limited spectrum resources. One way to increase the capacity of the network is to reuse a frequency after a certain reuse distance. Unfortunately, when the frequency is being reused, co-channel interference becomes a capacity limiting factor. Moreover, in emerging technologies, a node, e.g., a base station, may operate in a full-duplex mode that enables the node to simultaneously transmit and receive signals. When a transmitter User Equipment (UE) (or other end device or terminal) transmits to a node on a frequency on which a receiver UE receives a signal from the node, the receiver UE may receive an interference signal from the transmitter UE. As such, suppressing co-channel interference is advantageous.

BRIEF DESCRIPTION OF THE DRAWINGS

The teaching of the present disclosure can be more fully understood by reading the subsequent detailed description and examples in conjunction with references made to the accompanying drawings, in which.

To facilitate reading, identical reference numbers are used to designate elements that are common to various figures, where possible.

DETAILED DESCRIPTION

The present disclosure relates to suppressing co-channel interference in real-time. For example, the suppression of the co-channel interference may be applied on samples of data, as the samples are received and processed by a receiving device, e.g., a cell phone, a base station, etc.

As described above, when a frequency is being reused within a given geographical area, co-channel interference may limit the capacity of the wireless network. As such, wireless network service providers may wish to suppress co-channel interference. An example of co-channel interference due to frequency reuse is provided in Section B.

One approach to suppress the co-channel inference is to use a joint demodulation approach. The joint demodulation approach relies on demodulating both the desired signal as well as signals from any number of interference sources. Unfortunately, a channel from an interference source to the receiver is unknown.

One way to address interference from unknown sources may be to use a blind co-channel interference suppression approach, e.g., an Independent Component Analysis (ICA) technique. The blind co-channel interference suppression may be performed by demodulating the signal intended to be received, i.e., the desired signal, and suppressing all other signals from any number of interference sources. However, ICA techniques are complicated, involve block-wise computations, and may require processing each symbol separately. For example, each Orthogonal Frequency Division Multiplex (OFDM) symbol may need to be processed separately, one symbol at a time. For modern networks in which millions of samples are received at a given instant of time, running a block ICA is infeasible. As such, block ICA may be applied only on a small sample. When the block ICA is applied only on the small sample, the performance is sub-optimal for suppressing co-channel interference. Moreover, this approach is costly, in terms of storage, computation, etc., and increases processing delay. As such, for a network in which samples of data are received continuously, the above approaches are costly and sub-optimal for suppressing co-channel interference.

The present disclosure describes an apparatus and a method for suppressing co-channel interference in real-time. The real-time suppression of the co-channel interference may be performed in an online manner, e.g., using an online ICA, in accordance with aspects of the present disclosure. That is, as new samples are received, the ICA of the present disclosure processes the samples to suppress the co-channel interference. The co-channel interference is suppressed in real-time with less computation and faster convergence. For example, the method of the present disclosure may be implemented without matrix inversion. As such, the method is amenable to hardware implementation. In other words, the apparatus enables suppression of the co-channel interference in real-time, while providing an improvement in computational delay and cost. In practice, a full performance of a block ICA may be realized without: an additional complexity, an additional cost, or a need to limit application of the ICA to a smaller block of samples.

In order to clearly present the aspects of the present disclosure, various concepts used in identifying a desired signal in the presence of signals from any number of unknown interference sources are described in Section "A".

Figure 1:
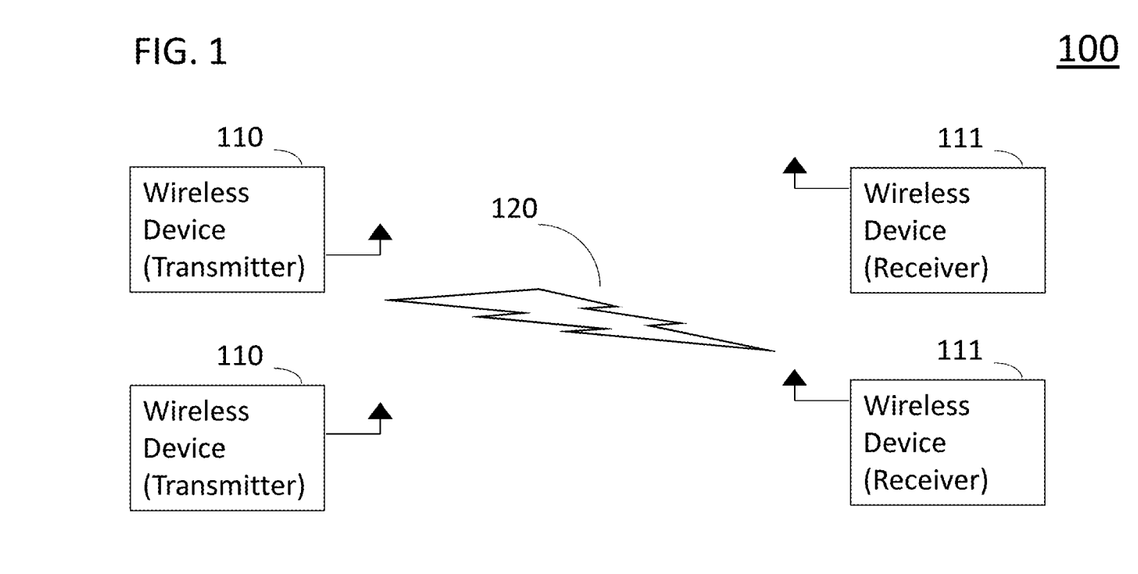
FIG. 1 illustrates a wireless network for providing services to wireless devices in accordance with an exemplary aspect of the present disclosure.

FIG. 1 illustrates a wireless network 100 for providing services to wireless devices in accordance with an exemplary aspect of the present disclosure. The wireless network comprises transmitter wireless devices 110 and receiver wireless devices 111 communicating over a wireless channel 120. For example, the wireless device 110 or 111 may be a user equipment. In addition, the wireless device may be a base station. It is noted that the antennas of the wireless devices 110 and 111 may be antennas of a transceiver that may be used for both transmitting and receiving of a wireless signal. As such, each wireless device may be a device for transmitting or receiving the wireless signal, based on whether a Radio Frequency (RF) signal is transmitted or received by the device.

A receiver of a wireless device 111, includes several components. For example, the receiver may include one or more of: an antenna, a duplexer, a filter, an amplifier, an RF down convertor, a digital demodulator, a pre-processor (e.g., for concatenating data, di-ciphering data, de-interleaving data, etc.), a channel decoder, digital-to-analog converter, etc.

Figure 2:
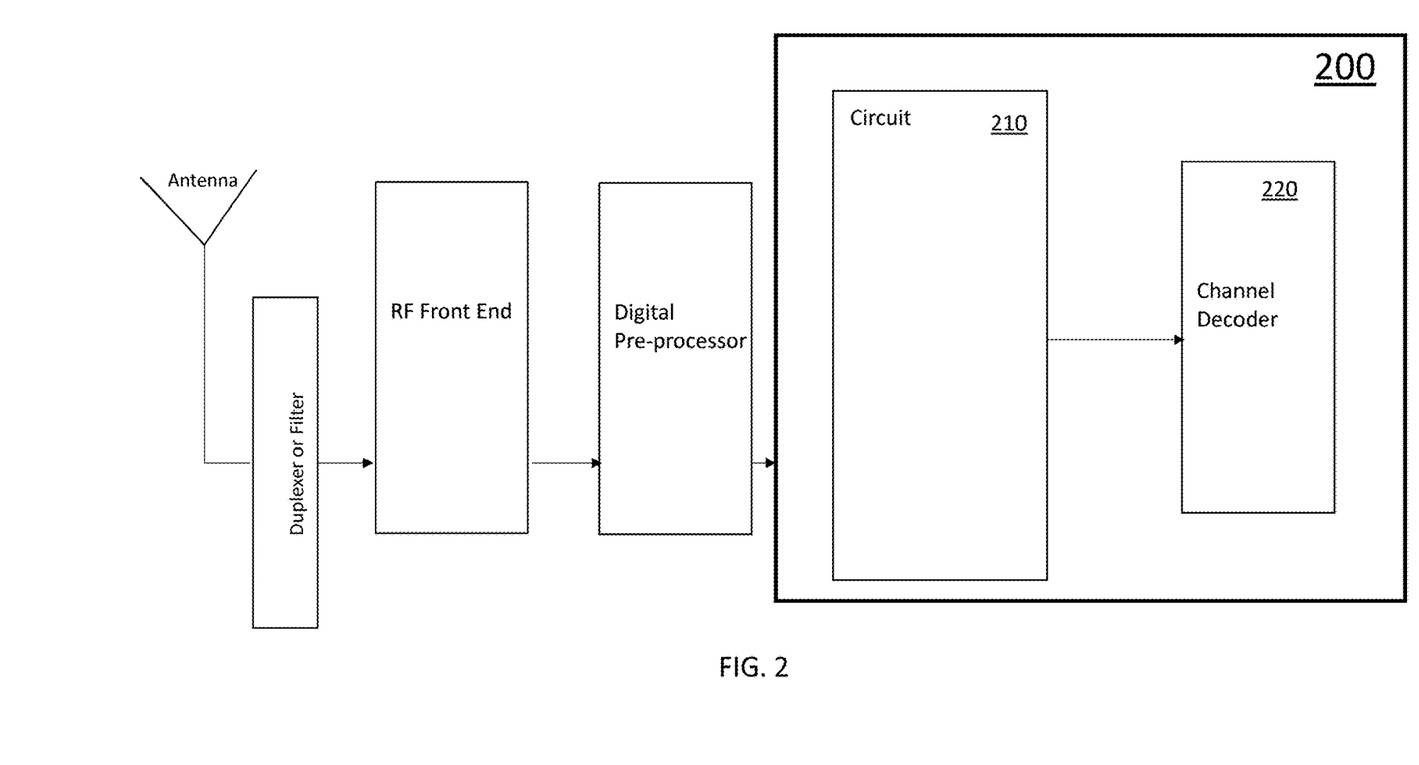
FIG. 2 illustrates an apparatus for identifying a desired signal and suppressing interference in accordance with an exemplary aspect of the present disclosure.

FIG. 2 illustrates an apparatus 200 for identifying a desired signal and suppressing interference in accordance with an exemplary aspect of the present disclosure. The apparatus is comprised within each receiver wireless device 111 described above with respect to FIG. 1. The receiver wireless device 111 is operable to receive a signal over a wireless channel, e.g., over a wireless channel of an LTE network. The apparatus 200 is operable to process the received signal and identify the desired signal. The desired signal is identified in the presence of signals from any number of unknown interference signal sources. The apparatus 200 comprises a circuit 210 and a channel decoder 220.

The circuit 210 is configured to: determine values of a first set of terms of a cost function that are based on received data, the cost function being a measure of a level of the received data being non-Gaussian, determine optimal values of a set of weight vectors for maximizing the cost function, and identify a desired signal based on the optimal values of the set of weight vectors and the values of the first set of terms.

The channel decoder 220 is coupled to the circuit 210, and configured to decode a channel of the desired signal that is identified.

In one aspect, the values of the first set of terms of the cost function are determined based on the received data of a current time interval, and values of the first set of terms determined for a previous time interval. For example, the values of the first set of terms may be determined in an online manner, as described in Section A. For instance, as shown in Eqn. (11).

In one aspect, the optimal values of a set of weight vectors for maximizing the cost function are determined by: defining a matrix of weights, setting values of each element of the matrix of weights to a set of initial values, and iteratively computing the optimal values for each row of the matrix of the weights. A number of rows of the matrix of weights is equal to a number of receive antennas. A number of columns of the matrix of weights is equal to a number of desired signals to be identified. For each row of the matrix, the computed optimal values are the values of the elements of the row of the matrix when convergence is achieved.

In one aspect, the convergence is achieved when a difference between currently computed and previously computed values of the row of the matrix is below a predetermined threshold. The difference is determined after orthonormalizing both the currently computed and previously computed values of the row. In one aspect, the difference may be computed as a Euclidean distance between a vector of the previously computed values of the row of the matrix and a vector of the currently computed values of the row of the matrix.

In one aspect, the currently computed values of the row of the matrix are based on: the previously computed values of the row of the matrix, the received data, and the values of the first set of terms of the cost function.

In one aspect, the cost function is expressed as a summation of a linear combination of non-linear terms comprising the first set of terms and a second set of terms. The first set of terms are based on the received data and the second set of terms are based on values of the set of weight vectors.

In one aspect, the received data comprises data received during a pre-determined length of time. For example, the pre-determined length of time may comprise a plurality of sampling cycles.

In one aspect, the circuit is further configured to receive a selected cost function. For example, another entity may select the cost function and provide the selected cost function to the receiver device that contains the apparatus. For instance, when the receiver device is a user equipment, the cost function may be selected by a server of the wireless network or the base station.

In one aspect, the apparatus further comprises a selector configured to select the cost function. The cost function may comprise any higher order function that is a measure of being non-Gaussian. In one aspect, the higher order function comprises a polynomial function, a Kurtosis function, etc. A Kurtosis refers to a normalized form of a fourth central moment of a distribution. For example, for a variable v, the Kurtosis may be defined as: kurtosis $(v)=E\{v^4\}-3(E\{v^2\})^2$.

In one aspect, the apparatus is configured in a user equipment. When the apparatus is configured in a user equipment, the desired signal is transmitted by a transmitter of a base station to the receiver device (i.e., the user equipment) comprising the apparatus.

In one aspect, the apparatus is configured in a base station. When the apparatus is configured in a base station, the desired signal is transmitted by a transmitter of a user equipment to the receiver device (i.e., the base station) comprising the apparatus.

Figure 3:
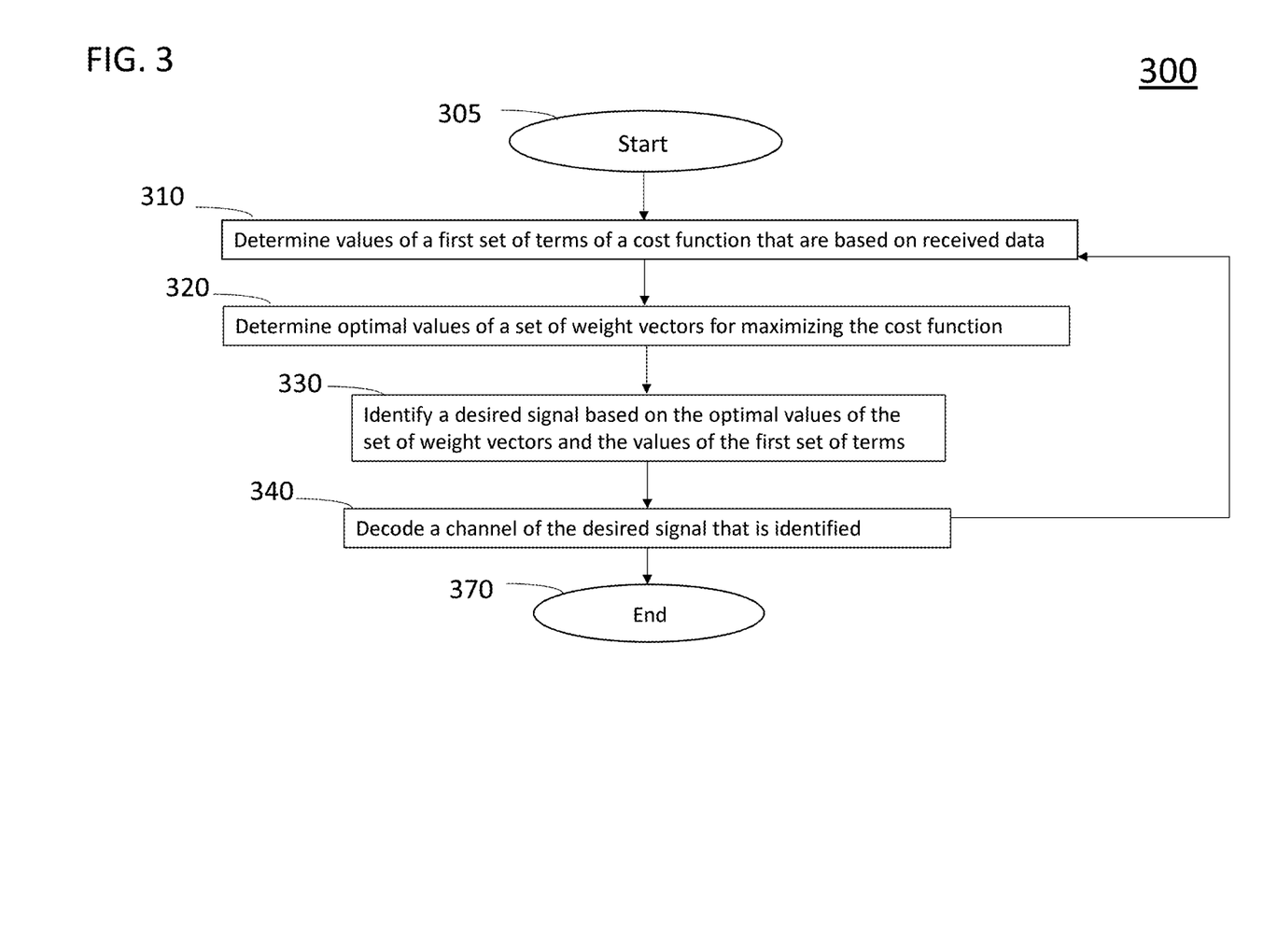
FIG. 3 illustrates a flowchart of an example method for identifying a desired signal and suppressing co-channel interference in real-time in accordance with the present disclosure.

FIG. 3 illustrates a flowchart of an example method 300 for identifying a desired signal and suppressing co-channel interference in real-time in accordance with the present disclosure. The operations of the method are not limited to the order described below, and the various operations may be performed in a different order. Further, two or more operations of the method may be performed simultaneously with each other.

Figure 4:
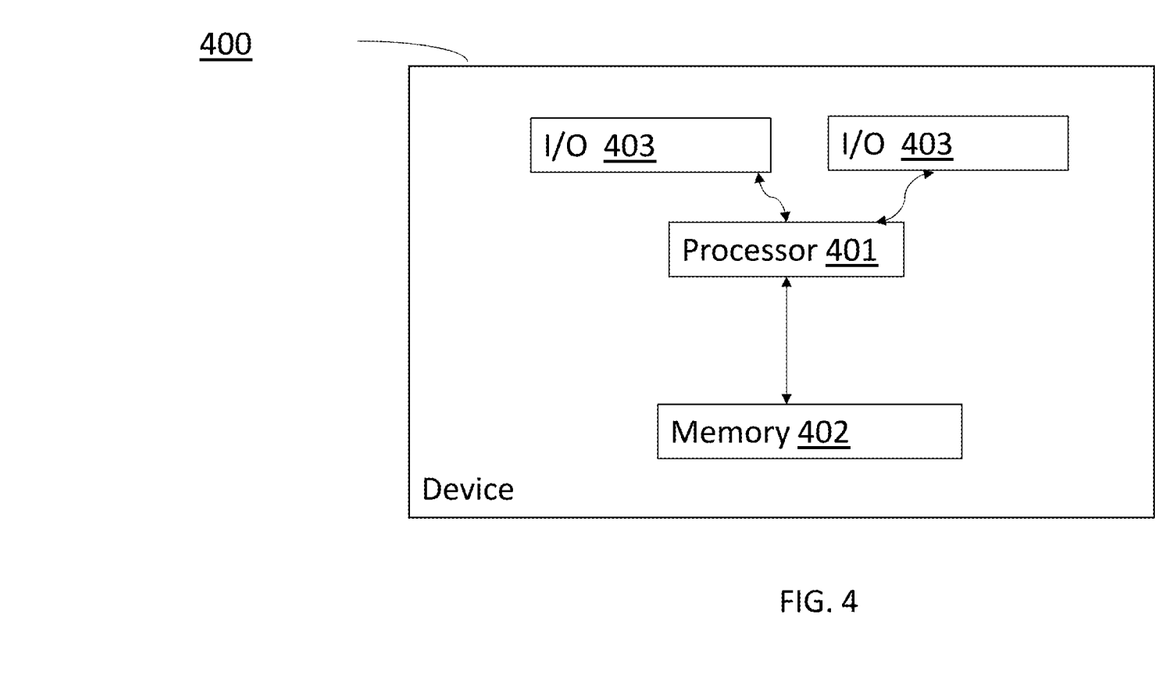
FIG. 4 illustrates a device configured to perform one or more functions described in one or more exemplary aspects of the present disclosure.

In one aspect of the present disclosure, the method 300 may be implemented in a wireless device that comprises one or more antennas configured to receive a wireless signal and an apparatus, e.g., apparatus 200. For example, a signal may be received over the wireless channel using a wireless device that comprises the apparatus 200. For example, the method 300 may be implemented in an apparatus 200 where in the determining values of a first set of terms of a cost function that are based on received data, the determining the optimal values of a set of weight vectors for maximizing the cost function, and the identifying desired signal based on the optimal values of the set of weight vectors and the values of the first set of terms are performed by circuit 210, and the decoding the channel of the desired signal that is identified is performed by the channel decoder 220. In another example, the method 300 may be implemented in a device 400, described below.

The method 300 starts in at operation 305 and proceeds to operation 310.

At operation 310, the method, by a circuit 210, determines values of a first set of terms of a cost function that are based on received data. The cost function is a measure of a level of the received data being non-Gaussian.

At operation 320, the method, by the circuit 210, determines optimal values of a set of weight vectors for maximizing the cost function.

At operation 330, the method, by the circuit 210, identifies a desired signal based on the optimal values of the set of weight vectors and the values of the first set of terms.

At operation 340, the method, by a channel decoder coupled to the circuit, decodes a channel of the desired signal that is identified.

The method may then proceed to operation 370 to end the identifying of a desired signal and suppressing of co-channel interference or to operation 305 to receive a signal and process the received signal in accordance with the present disclosure.

FIG. 4 illustrates a device 400 configured to perform one or more functions described in one or more exemplary aspects of the present disclosure. The device 400 comprises a processor 401 and a memory 402 configured to store program instructions to be executed by the processor 401, where executing the program instructions causes the processor 401 to perform operations for identifying a desired signal and suppressing co-channel interference in real-time from a signal received over a wireless channel, the operations comprise, determining values of a first set of terms of a cost function that are based on received data, the determining the optimal values of a set of weight vectors for maximizing the cost function, and the identifying desired signal based on the optimal values of the set of weight vectors and the values of the first set of terms, and decoding the channel of the desired signal that is identified. The device 400 may further comprise any number and type of input/output devices 403.

It is noted that although FIG. 4 illustrates a single device, the method 300 may be implemented via any number of devices performing the operations of method 300 in a distributed manner, serial manner, or a combination thereof. In addition, the devices may be virtualized devices instantiated on servers (e.g., servers of a cloud network). As such, the representation of the hardware components of the device may be a virtualized or a physical representation, without departing from the teaching of the present disclosure. Accordingly, the method 300 may be implemented in hardware, software, or a combination thereof. It is noted that the processor 401 executing the program instructions includes the processor 401 performing the operations of the method 300 directly or indirectly. For example, the processor 401 may perform the operations in conjunction with other devices or may direct another device to perform the operations.

It should be understood that the aspects of the present disclosure are described above by way of examples. However, the various aspects are exemplary and not limitations. Thus, the scope of the present disclosure should not be construed as being limited by any of the above aspects or examples. The breadth and the scope of the present disclosure should be defined in accordance with the scope and breadth of the following claims and/or equivalents.

A: Identifying a Desired Signal in the Presence of Interferer Signals Transmitted from any Number of Unknown Sources First, suppose a receiver has N antennas. Each of the N antennas may observe a desired signal stream along with interfering signal streams from any number of interferers (i.e., sources of interfering signals).

Suppose, $M_D$ represents a number of desired signal streams, and $M_I$ represents a number of interfering signal streams. For example, $M_D$ transmit antennas are transmitting signals that are intended to be received and $M_I$ transmit antennas are transmitting signals that cause interference.

Suppose also, Y represents the observed signal stream via the N receiver antennas for a time duration T, H represents the channel matrix, and S represents the set of all received signal streams. Note that the channel matrix H is assumed to be unknown and is a matrix of size $N \times (M_D+M_I)$. In addition, the transmitters sending the interfering signal streams are unknown to the receiver. However, it is assumed that some statistical properties of the sources may be inferred. For instance, each of the sources are assumed as being non-Gaussian sources.

Then, the observed signal stream Y for the time duration T may be represented as:

$$Y_{N \times T} = HS_{(M_D+M_I) \times T} + n \qquad \text{Eqn. (1)}$$

$$\text{Where, } S = \begin{pmatrix} S_D \\ S_I \end{pmatrix} \qquad \text{Eqn. (2)}$$

$S_D$ is a matrix of size $M_D \times T$ comprising the desired streams, and $S_I$ is a matrix of size $M_I \times T$ comprising the interfering streams.

As described above, H in Eqn. (1) is unknown. Therefore, determining $S_D$ by matrix inversion is not feasible. However, some known statistical properties may be exploited.

Recalling the Central Limit Theorem (CLT), a sum of a set of non-Gaussian variables is more Gaussian than each of the individual variables. Thus, the observed signal stream Y is more Gaussian than each signal stream (desired or interfering). Hence, when a measure of being non-Gaussian is maximized, individual sources may be extracted from Eqn. (1).

Then, the problem of searching for the $S_D$ (i.e., the desired signals) in Eqn. (1) may be formulated as a search for a set of weight vectors, $W = w_1, w_2, \ldots, w_{M_D}$, such that:

$$w_i^H Y \approx \alpha_i S_D^i + \text{noise}, i=1, \ldots, M_D, \qquad \text{Eqn. (3)}$$

Where, $w_i^H$ represents a Hermitian conjugate of $w_i$.

For example, suppose there are three receive antennas: antenna1, antenna2, and antenna3 of the desired node, and the receive antennas are receiving two desired signals. That is, $M_D=2$ and $N=3$.

Then, a matrix of the weight vectors may be defined as:

$$W = \begin{bmatrix} w_{1,antenna1} & w_{2,antenna1} \\ w_{1,antenna2} & w_{2,antenna2} \\ w_{1,antenna3} & w_{2,antenna3} \end{bmatrix}.$$

Similarly, a matrix of the $w_i^H$ may be derived by transposing and taking the conjugate of W.

As noted above, the received signal includes both the desired and interfering signal streams. Returning to Eqn. (3), recall that $M_D$ is the number of desired signal streams. Then, the observed signal stream Y is a linear combination of the received signals, and a solution of Eqn. (1) may be obtained by searching for a set of weight vectors that maximize a measure of being non-Gaussian. In other words, when the observed signal stream Y is projected on an optimal set of weight vectors, the interfering streams are suppressed. For clarity, the stream after the observed signal stream Y is projected onto the optimal set of weight vectors may be denoted by "Ŷ". Therefore, Ŷ depends only on the desired signals. As such, the individual sources may be extracted by maximizing a measure of being non-Gaussian.

Suppose a function G(z) is known as being a measure of being non-Gaussian. Then, the optimization problem may be written in terms of an argument for maximizing an expectation of the function G(z). Some examples of functions that are known as being a measure of being non-Gaussian are a Kurtosis, a higher order function (e.g., a polynomial function), and the like. For clarity, "Kurtosis" refers to a normalized form of a fourth central moment of a distribution. For example, for a variable v, the Kurtosis may be defined as:

$$\text{kurtosis}(v) = E\{v^4\} - 3(E\{v^2\})^2.$$

For example, the optimum weights may be computed by searching for weights that maximize $E\{|G(w^H Y)|^2\}$. In other words, an optimization problem of Eqn. (4) may be used to extract the sources of interest as follows:

$$w_{opt} = \text{argmax } E\{|G(w^H Y)|^2\}. \quad \text{Eqn. (4)}$$

In one aspect, a block ICA method may be used to solve the optimization problem of Eqn. (4). For example, suppose the input data is whitened. An algorithm for solving the optimization problem using the block ICA method may be provided as follows:

1) Write the observed stream Y, in terms of the streams in accordance with Eqn. (1). For example, observations for T sampling intervals may be written as: $Y_{N \times T} = H_{N \times N} S_{N \times T} + n_{N \times T}$, wherein n accounts for the noise.
2) Initialize the weight vectors. For example, set W to initial values, W=I.
3) For each row $w_i \in W$, iterate until convergence by performing (a) and (b):

$$(a) w_i^{j+1} = -E\{G^*(z)G^*(z)Y\} + E\{G'(z)G'^*(z)\} w_i^j + E\{yy^T\}$$
$$E\{G^*(z)G''(z)\} w_i^{j*} \quad \text{Eqn. (5)}$$

(b) Orthonormalize the rows of W, e.g., orthonormalize the rows to get a unitary W.

Note that in Eqn. 5(b), certain orthonormalizing methods may require that the matrix W be square, in which case, a square matrix, $W_{D \text{ and } I}$, may be defined. For instance, $W_{D \text{ and } I}$ may be defined with weight vectors for both the desired and interfering streams. For the example described above, matrix $W_{D \text{ and } I}$ may be defined as:

$$W_{D \text{ and } I} = \begin{bmatrix} w_{1,antenna1} & w_{2,antenna1} & w_{interference,antenna1} \\ w_{1,antenna2} & w_{2,antenna2} & w_{interference,antenna2} \\ w_{1,antenna3} & w_{2,antenna3} & w_{interference,antenna3} \end{bmatrix}.$$

Then, Eqns. 4 and 5 may be applied on $W_{D \text{ and } I}$.

Those ordinarily skilled in the current art realize that the orthonormalizing may be performed without a matrix operation that restricts the dimensions of the weight vector. As such, Eqn. 5(b) is not intended to limit the operation of orthonormalizing to the exemplary approach.

For clarity, the y in Eqn. (5) is one column of the matrix Y and operation 3(b) is performed for each iteration. In addition, each term of Eqn. (5) that includes a computation of an expectation uses all the y samples. Therefore, the algorithm is a "block" algorithm due to operation 3(a).

For networks in which new samples are received continuously, updating the weights using the block algorithm, described above, is computationally intensive. Therefore, the above approach for solving the optimization problem may not be suitable for updating the weights as new samples are received, i.e., in an online manner.

The present disclosure describes an approach for finding the optimal weights of the above optimization problem such that the weights can be updated in an online manner.

Returning to Eqn. (5), suppose the computations that include an expectation are modified by expanding the terms as a summation. For example, the last term of Eqn. (5) includes: $E\{G^*(z)G''(z)\}$.

The term "$E\{G^*(z)G''(z)\}$" may be modified as:

$$E\{G^*(z)G''(z)\} = \quad \text{Eqn. (6)}$$
$$E\{G^*(w^H y)G''(w^H y)\} \approx \frac{1}{T} \sum_t G^*(w^H y(t)) G''(w^H y(t)).$$

A modification may be performed for computing $E\{G^*(z)G^*(z)Y\}$ and $E\{G'(z)G'^*(z)\}$ in a similar manner.

Then, the terms in the summation are expanded as a linear combination of non-linear terms containing the weights and the received samples. In addition, the expanded terms are arranged such that computations based on weights are separated from computations based on the y terms.

For an illustrative example: suppose the transmission system is a 2×2 system, with N=2, $M_D$=1, and $M_I$=1. Then, $$W = \begin{bmatrix} w_{11} \\ w_{21} \end{bmatrix}.$$

Suppose, also $$G(z) = z^2. \quad \text{Eqn. (7)}$$

Then, Eqn. (6) may be rewritten as follows:

$$E\{G^*(z)G''(z)\} \approx 2/T \sum_{t=1}^{T} w_{11}^2 y_1(t)^{2*} + w_{21}^2 y_2(t)^{2*} + 2 w_{11} w_{21} y_1(t)^* y_2(t)^* \quad \text{Eqn. (8)}$$

Note that in Eqn. (8), if weights from a previous iteration are used, the weights may considered as constants for a current iteration. Therefore, Eqn. (8) may be rewritten by pushing the summations inside such that each term contains new values only for the y terms. In other words, the computation of Eqn. (8) for a current iteration may be based on new values for the y terms and previous values for the weights.

Then, pushing the summations inside, the above is rewritten as follows:

$$E\{G^*(z)G''(z)\} \approx \frac{2}{T}\left(w_{11}^2 \sum_{t=1}^{T} y_1(t)^{2*} + \quad \text{Eqn. (9)}\right.$$
$$\left. w_{21}^2 \sum_t y_2(t)^{2*} + 2 w_{11} w_{21} \sum_t y_1(t)^* y_2(t)^* \right) =$$
$$2/T(w_{11}^2 \alpha_1(t) + w_{21}^2 \alpha_2(t) + 2 * w_{11} w_{21} \alpha_3(t)^2)$$

Where, $$\alpha_1(t) = \sum_{t=1}^{T} y_1(t)^{2*}, \alpha_2(t) = \sum_{t=1}^{T} y_2(t)^{2*}, \text{ and}$$
$$\alpha_3(t)^2 = \sum_{t=1}^{T} y_1(t)^* y_2(t)^*. \quad \text{Eqn. (10)}$$

Note that each $\alpha_k$ in Eqn. (10) can be computed from a respective value of a previous time and a sample of the current time. For example, $$\alpha_1(t) = \alpha_1(t-1) + y_1(t)^2,$$

$$\alpha_2(t) = \alpha_2(t-1) + y_2(t)^2, \text{ and}$$

$$\alpha_3(t) = \alpha_3(t-1) + y_1(t)^* y_2(t)^*. \quad \text{Eqn. (11)}$$

The computations of Eqn. (9) through Eqn. (11) are amenable for online updates. An algorithm for solving the optimization problem using an online approach may be provided as follows:

1) Write the observed stream Y, in terms of the streams in accordance with Eqn. (1). For example, observations for T sampling intervals may be written as: $Y_{N \times T} = H_{N \times N} S_{N \times T} + n_{N \times T}$, wherein n accounts for the noise.
2) Initialize the weight vectors. For example, set W to initial values, W=I.
3) Update $\alpha_k(t)$ based on $\alpha_k(t-1)$.
4) For each row $w_i \in W$, iterate until convergence by performing (a) and (b).
   (a) Compute $w_i^{j+1}$ as a function of $w_i^j$, $\{\alpha_k\}$, y(t). The computation of $w_i^{j+1}$ comprises finding values of $w_i^{j+1}$ in Eqn. (5), part (a), with each expectation expanded, for instance, as illustrated in Eqns. (9)-(11).
   (b) Orthonormalize the rows to get a unitary W.

Note that when G is a polynomial function, the expansions of the terms, e.g., as shown in Eqn. (6), are exact. Therefore, the online algorithm performs the same as the block algorithm when G is a polynomial function. For other complicated G functions, a Taylor series expansion may be used to obtain non-exact solutions in accordance with a desired accuracy.

It is noted that the ICA of the present disclosure can be applied using a wide range of cost functions, e.g., based on application and/or preference.

In one aspect, the higher order function may comprise any function that permits the cost function to be expressed as a linear combination of nonlinear terms. The terms containing values of the set of weight vectors and terms containing the received data are separated. The polynomial and Kurtosis functions are examples of higher order functions that allow decomposition of terms such that terms containing values of the set of weight vectors are separable from terms that contain the received data.

B: Example of Co-Channel Interference

Figure 5:
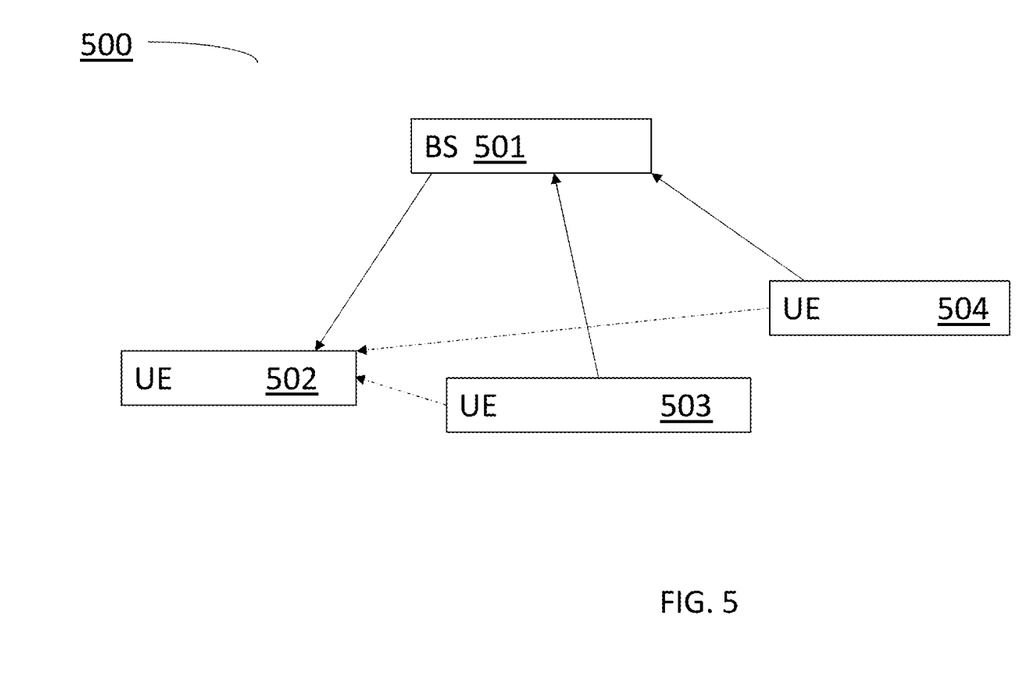
FIG. 5 illustrates an exemplary network 500 where interference is received by User Equipment (UE)

FIG. 5 illustrates an exemplary network 500 where interference is received by User Equipment (UE). Base Station (BS) 501 supports full duplex communication and downlink UEs 502 through 504 support half-duplex communication. Each of the devices 501-504 may have any number of antennas.

Suppose BS 501 transmits a signal to UE 502 on a given frequency. If either UE 503 or 504 uses the same frequency to transmit to BS 501, UE 502 receives a co-channel interference signal.

Figure 6:
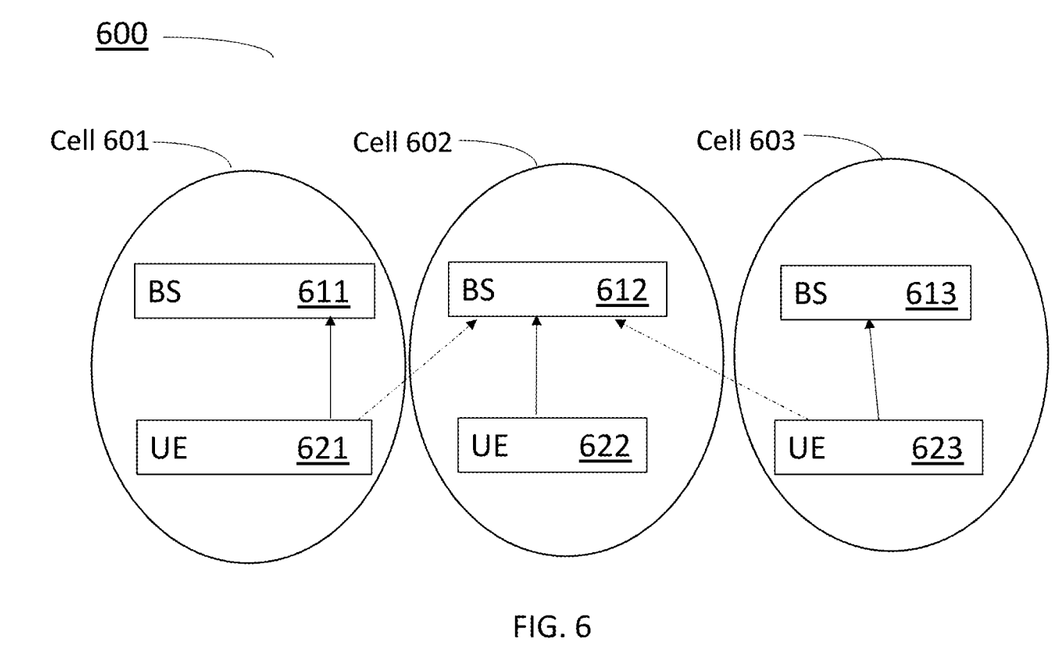
FIG. 6 illustrates an exemplary network 600 where interference is received by a BS.

FIG. 6 illustrates an exemplary network 600 where interference is received by a BS. Adjacent cells 601, 602 and 603 comprise BS 611, 612 and 613, respectively. UEs 621, 622 and 623 are communicatively coupled to BS 611, 612 and 613, respectively.

Suppose BS 612 is receiving a signal from UE 622 on the same frequency on which UEs 621 and 623 transmit to their respective base station. Then, BS 612 may receive a co-channel interference signal from adjacent cells.

The following examples pertain to further embodiments.

Example 1 is an apparatus operable for interference cancellation, the apparatus comprising: a circuit configured to: determine values of a first set of terms of a cost function that are based on received data, the cost function being a measure of a level of the received data being non-Gaussian, determine optimal values of a set of weight vectors for maximizing the cost function, and identify the desired signal based on the optimal values of the set of weight vectors and the values of the first set of terms; and a channel decoder, coupled to the circuit, and configured to decode a channel of the desired signal that is identified.

In Example 2, the subject matter of Example 1, wherein the values of the first set of terms of the cost function are determined based on: the received data of a current time interval, and values of the first set of terms determined for a previous time interval.

In Example 3, the subject matter of Example 1, wherein the optimal values of the set of weight vectors for maximizing the cost function are determined by: defining a matrix of weights, each column of the matrix comprising a weight vector of the set of weight vectors; setting values of each element of the matrix of weights to a set of initial values; and for each row of the matrix of the weights, iteratively computing the optimal values until convergence is achieved for the row.

In Example 4, the subject matter of Example 3, wherein, a number of rows of the matrix of weights is equal to a number of receive antennas, and a number of columns of the matrix of weights is equal to a number of desired signals to be identified, or the number of desired signals to be identified and a number of interfering signals.

In Example 5, the subject matter of Example 3, wherein for the row of the matrix, the computed optimal values are the values of the elements of the row of the matrix when convergence is achieved for the row.

In Example 6, the subject matter of Example 3, wherein the convergence is achieved when a difference between currently computed and previously computed values of the row of the matrix is below a pre-determined threshold.

In Example 7, the subject matter of Example 6, wherein the difference is determined after orthonormalizing both the currently computed and previously computed values of the row of the matrix.

In Example 8, the subject matter of Example 6, wherein the difference is computed as a Euclidean distance between a vector of the previously computed values of the row of the matrix and a vector of the currently computed values of the row of the matrix.

In Example 9, the subject matter of Example 6, wherein the currently computed values of the row of the matrix are based on: the previously computed values of the row of the matrix, the received data, and the values of the first set of terms of the cost function.

In Example 10, the subject matter of Example 1, wherein the cost function is expressed as a summation of a linear combination of non-linear terms comprising the first set of terms and a second set of terms, the first set of terms being based on the received data and the second set of terms being based on the values of the set of weight vectors.

In Example 11, the subject matter of Example 1, wherein the received data comprises data received during a pre-determined length of time.

In Example 12, the subject matter of Example 1, wherein the circuit is further configured to receive the cost function from another entity, the entity being a server, user equipment or a base station.

In Example 13, the subject matter of Example 1, further comprising: a selector, coupled to the circuit, and configured to select the cost function and provide the selected cost function to the circuit.

In Example 14, the subject matter of Example 1, wherein the cost function comprises a higher order function that is a measure of being non-Gaussian.

In Example 15, the subject matter of Example 14, wherein the higher order function comprises a function that permits the cost function to be expressed as a linear combination of nonlinear terms, wherein terms containing values of the set of weight vectors and terms containing the received data are separated.

In Example 16, the subject matter of Example 1, wherein the apparatus is configured in an end device or terminal.

In Example 17, the subject matter of Example 16, wherein the desired signal is transmitted by a transmitter of a base station to the end device or terminal.

In Example 18, the subject matter of Example 1, wherein the apparatus is configured in a base station.

In Example 19, the subject matter of Example 18, wherein the desired signal is transmitted by a transmitter of an end device or terminal.

Example 20 is a wireless device, comprising: one or more antennas configured to receive a signal; and the apparatus of Example 1, wherein the signal is received over the wireless channel.

In Example 21, the subject matter of Example 20, wherein: the values of the first set of terms of the cost function are determined based on: the received data of a current time interval, and values of the first set of terms determined for a previous time interval, and the optimal values of the set of weight vectors for maximizing the cost function are determined by: defining a matrix of weights, each column of the matrix comprising a weight vector of the set of weight vectors, setting values of each element of the matrix of weights to a set of initial values, and for each row of the matrix of the weights, iteratively computing the optimal values until convergence is achieved for the row.

Example 22 is a method for identifying a desired signal and suppressing co-channel interference in real-time, the method comprising: determining, by a circuit, values of a first set of terms of a cost function that are based on received data, the cost function being a measure of a level of the received data being non-Gaussian; determining, by the circuit, optimal values of a set of weight vectors for maximizing the cost function; identifying, by the circuit, the desired signal based on the optimal values of the set of weight vectors and the values of the first set of terms; and decoding, by a channel decoder coupled to the circuit, a channel of the desired signal that is identified.

In Example 23, the subject matter of Example 22, further comprising: selecting, by a selector coupled to the circuit, the cost function and providing the selected cost function to the circuit.

Example 24 is a device, comprising: a processor; and a memory configured to store a program instructions to be executed by the processor, where executing the program instructions causes the processor to perform operations for identifying a desired signal and suppressing co-channel interference in real-time from a signal received over a wireless channel, the operations comprising: determining values of a first set of terms of a cost function that are based on received data, the cost function being a measure of a level of the received data being non-Gaussian; determining optimal values of a set of weight vectors for maximizing the cost function; identifying the desired signal based on the optimal values of the set of weight vectors and the values of the first set of terms; and decoding a channel of the desired signal that is identified.

In Example 25, the subject matter of Example 24, the operations further comprising: selecting the cost function.

Example 26 is an apparatus operable to identify a desired signal and suppress co-channel interference in real-time from a signal received over a wireless channel, the apparatus comprising: a circuit means for: determining values of a first set of terms of a cost function that are based on received data, the cost function being a measure of a level of the received data being non-Gaussian, determining optimal values of a set of weight vectors for maximizing the cost function, and identifying the desired signal based on the optimal values of the set of weight vectors and the values of the first set of terms; and a channel decoding means, coupled to the circuit, and for decoding a channel of the desired signal that is identified.

In Example 27, the subject matter of Example 26, wherein the values of the first set of terms of the cost function are determined based on: the received data of a current time interval, and values of the first set of terms determined for a previous time interval.

In Example 27, the subject matter of Example 26, wherein the optimal values of the set of weight vectors for maximizing the cost function are determined by: defining a matrix of weights, each column of the matrix comprising a weight vector of the set of weight vectors; setting values of each element of the matrix of weights to a set of initial values; and for each row of the matrix of the weights, iteratively computing the optimal values until convergence is achieved for the row.

In Example 29, the subject matter of Example 28, wherein, a number of rows of the matrix of weights is equal to a number of receive antennas, and a number of columns of the matrix of weights is equal to a number of desired signals to be identified, or the number of desired signals to be identified and a number of interfering signals.

In Example 30, the subject matter of Example 28, wherein for the row of the matrix, the computed optimal values are the values of the elements of the row of the matrix when convergence is achieved for the row.

In Example 31, the subject matter of Example 28, wherein the convergence is achieved when a difference between currently computed and previously computed values of the row of the matrix is below a pre-determined threshold.

In Example 32, the subject matter of Example 31, wherein the difference is determined after orthonormalizing both the currently computed and previously computed values of the row of the matrix.

In Example 33, the subject matter of Example 31, wherein the difference is computed as a Euclidean distance between a vector of the previously computed values of the row of the matrix and a vector of the currently computed values of the row of the matrix.

In Example 34, the subject matter of Example 31, wherein the currently computed values of the row of the matrix are based on: the previously computed values of the row of the matrix, the received data, and the values of the first set of terms of the cost function.

In Example 35, the subject matter of Example 26, wherein the cost function is expressed as a summation of a linear combination of non-linear terms comprising the first set of terms and a second set of terms, the first set of terms being based on the received data and the second set of terms being based on the values of the set of weight vectors.

In Example 36, the subject matter of Example 26, wherein the received data comprises data received during a pre-determined length of time.

In Example 37, the subject matter of Example of 26, wherein the circuit means is further for receiving the cost function from another entity, the entity being a server, user equipment or a base station.

In Example 38, the subject matter of Example 26, further comprising: a selector means, coupled to the circuit, and for selecting the cost function and provide the selected cost function to the circuit.

In Example 39, the subject matter of Example 26, wherein the cost function comprises a higher order function that is a measure of being non-Gaussian.

In Example 40, the subject matter of Example 39, wherein the higher order function comprises a function that permits the cost function to be expressed as a linear combination of nonlinear terms, wherein terms containing values of the set of weight vectors and terms containing the received data are separated.

In Example 41, the subject matter of Example 26, wherein the apparatus is configured in a user equipment.

In Example 42, the subject matter of Example 26, wherein the desired signal is transmitted by a transmitter of a base station to the user equipment.

In Example 43, the subject matter of Example 26, wherein the apparatus is configured in a base station.

In Example 44, the subject matter of Example 43, wherein the desired signal is transmitted by a transmitter of a user equipment to the base station.

Example 45 is a wireless device, comprising: one or more antennas configured to receive a signal; and the apparatus of Example 26, wherein the signal is received over the wireless channel.

In Example 46, the subject matter of Example 45, wherein: the values of the first set of terms of the cost function are determined based on: the received data of a current time interval, and values of the first set of terms determined for a previous time interval, and the optimal values of the set of weight vectors for maximizing the cost function are determined by: defining a matrix of weights, each column of the matrix comprising a weight vector of the set of weight vectors, setting values of each element of the matrix of weights to a set of initial values, and for each row of the matrix of the weights, iteratively computing the optimal values until convergence is achieved for the row.

What is claimed is:

1. An apparatus operable for interference cancellation, the apparatus comprising:
    a circuit configured to:
        determine values of a first set of terms of a cost function that are based on received data, the cost function being a measure of a level of the received data being non-Gaussian,
        determine optimal values of a set of weight vectors for maximizing the cost function by setting initial values for each element of a matrix of weights with each column of the matrix of weights including a weight vector of the set of weight vectors and, for each row of the matrix of the weights, iteratively computing optimal values until convergence is achieved for the row, and
        identify the desired signal based on the optimal values of the set of weight vectors and the values of the first set of terms; and
    a channel decoder, coupled to the circuit, and configured to decode a channel of the desired signal that is identified.

2. The apparatus of claim 1, wherein the values of the first set of terms of the cost function are determined based on:
    the received data of a current time interval, and
    values of the first set of terms determined for a previous time interval.

3. The apparatus of claim 1, wherein
    a number of rows of the matrix of weights is equal to a number of receive antennas, and
    a number of columns of the matrix of weights is equal to (i) a number of desired signals to be identified, or (ii) the number of desired signals to be identified and a number of interfering signals.

4. The apparatus of claim 1, wherein for the row of the matrix, the computed optimal values are the values of the elements of the row of the matrix when convergence is achieved for the row.

5. The apparatus of claim 1, wherein the convergence is achieved when a difference between currently computed and previously computed values of the row of the matrix is below a pre-determined threshold.

6. The apparatus of claim 5, wherein the difference is determined after orthonormalizing both the currently-computed and the previously-computed values of the row of the matrix.

7. The apparatus of claim 5, wherein the difference is computed as a Euclidean distance between a vector of the previously-computed values of the row of the matrix and a vector of the currently-computed values of the row of the matrix.

8. The apparatus of claim 5, wherein the currently-computed values of the row of the matrix are based on: the previously-computed values of the row of the matrix, the received data, and the values of the first set of terms of the cost function.

9. The apparatus of claim 1, wherein the cost function is expressed as a summation of a linear combination of non-linear terms comprising the first set of terms and a second set of terms, the first set of terms being based on the received data, and the second set of terms being based on the values of the set of weight vectors.

10. The apparatus of claim 1, wherein the received data comprises data received during a pre-determined length of time.

11. The apparatus of 1, wherein the circuit is further configured to receive the cost function from another entity, the entity being a server, user equipment or a base station.

12. The apparatus of claim 1, further comprising:
    a selector, coupled to the circuit, the selector being configured to select the cost function and to provide the selected cost function to the circuit.

13. The apparatus of claim 1, wherein the cost function comprises a higher-order function that is a measure of being non-Gaussian.

14. The apparatus of claim 13, wherein the higher-order function comprises a function that permits the cost function to be expressed as a linear combination of nonlinear terms, wherein terms containing values of the set of weight vectors and terms containing the received data are separated.

15. The apparatus of claim 1, wherein the apparatus is configured in an end device or terminal.

16. The apparatus of claim 15, wherein the desired signal is transmitted by a transmitter of a base station to the end device or terminal.

17. The apparatus of claim 1, wherein the apparatus is configured in a base station.

18. The apparatus of claim 17, wherein the desired signal is transmitted by a transmitter of an end device or terminal to the base station.

19. The apparatus of claim 1, further comprising:
    one or more antennas configured to receive a signal, wherein the signal is received over a wireless channel.

20. The wireless device of claim 19, wherein:
the values of the first set of terms of the cost function are determined based on: the received data of a current time interval, the values of the first set of terms being determined for a previous time interval, and
wherein each column of the matrix of weights includes a weight vector of the set of weight vectors.

21. A method for identifying a desired signal and suppressing co-channel interference in real-time, the method comprising:
determining, by a circuit, values of a first set of terms of a cost function that are based on received data, the cost function being a measure of a level of the received data being non-Gaussian;
determining, by the circuit, optimal values of a set of weight vectors for maximizing the cost function by setting initial values for each element of a matrix of weights with each column of the matrix of weights including a weight vector of the set of weight vectors and, for each row of the matrix of the weights, iteratively computing optimal values until convergence is achieved for the row;
identifying, by the circuit, the desired signal based on the optimal values of the set of weight vectors and the values of the first set of terms; and
decoding, by a channel decoder coupled to the circuit, a channel of the desired signal that is identified.

22. The method of claim 21, further comprising:
selecting, by a selector coupled to the circuit, the cost function and providing the selected cost function to the circuit.

23. A device, comprising:
a processor; and
a memory configured to store a program instructions to be executed by the processor, where executing the program instructions causes the processor to perform operations for identifying a desired signal and suppressing co-channel interference in real-time from a signal received over a wireless channel, the operations comprising:
determining values of a first set of terms of a cost function that are based on received data, the cost function being a measure of a level of the received data being non-Gaussian;
determining optimal values of a set of weight vectors for maximizing the cost function by setting initial values for each element of a matrix of weights with each column of the matrix of weights including a weight vector of the set of weight vectors and, for each row of the matrix of the weights, iteratively computing optimal values until convergence is achieved for the row;
identifying the desired signal based on the optimal values of the set of weight vectors and the values of the first set of terms; and
decoding a channel of the desired signal that is identified.

24. The device of claim 23, the operations further comprising:
selecting the cost function.

* * * * *